(No Model.)

W. D. EWART.
METHOD OF TESTING CHAINS.

No. 371,745. Patented Oct. 18, 1887.

ATTEST:
J. A. Hundle
H. Hansen

INVENTOR:
William D. Ewart
By J. N. McIntire
Attorney

UNITED STATES PATENT OFFICE.

WILLIAM D. EWART, OF CHICAGO, ILLINOIS, ASSIGNOR TO THE EWART MANUFACTURING COMPANY, OF ILLINOIS.

METHOD OF TESTING CHAINS.

SPECIFICATION forming part of Letters Patent No. 371,745, dated October 18, 1887.

Application filed April 27, 1887. Serial No. 236,323. (No model.)

*To all whom it may concern:*

Be it known that I, WILLIAM D. EWART, of Chicago, in the county of Cook and State of Illinois, have invented a new and useful Improvement in Testing the Strength of Chains; and I do hereby declare that the following is a clear, full, and exact description thereof, reference being had to the accompanying drawings, making part of this specification.

My present invention relates to the art or process of testing chains, and is applicable with the greatest advantages to that type or species of cable-chain which is composed of comparatively long centrally-open links, designed usually to be used in connection with some sort of sprocket-wheel.

In the testing of chains according to the modes heretofore practiced, so far as my knowledge of the prior state of the art extends, it has been the custom to subject the chain in sections of convenient length to the action of the testing machine or appliances (of one kind or another) with the chain stretched out to its greatest possible length. A serious difficulty in or objection to this heretofore practiced mode is that (especially in the larger sizes of cable drive-chains with comparatively long links) the testing process or operation is necessarily slow, consuming much time and labor. I propose to overcome this difficulty to a great extent and provide for use a method and means by which a very much larger quantity of chain can be tested within the same time and with the same amount of labor and expenditure of power than it has been possible to test heretofore; and to this main end and object my improvement in the art of testing chain may be said to consist, essentially, in condensing the congregated or assembled links of the chain and holding them by suitable means in such condensed condition while subjecting the chain to the usual draft strain to test the strength of its parts, all as will be hereinafter more fully explained, and as will be particularly pointed out and defined in the claim of this specification.

To enable those skilled in the art to which my improvement relates to understand and practice my invention, I will now proceed to more fully describe it, referring by letters to the accompanying drawings, which form part of this specification, and in which I have illustrated the means and methods by which my improvement in the art is carried into practical effect.

Figure 1:
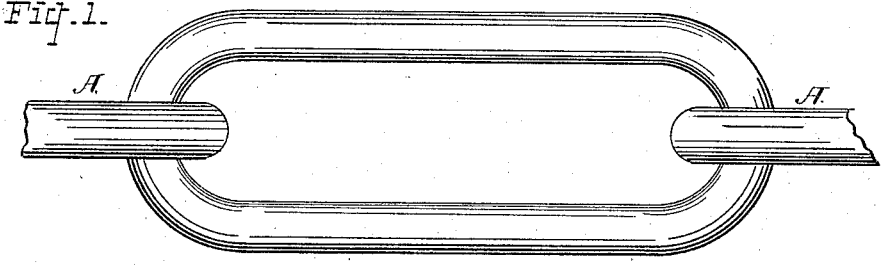
Figure 2:
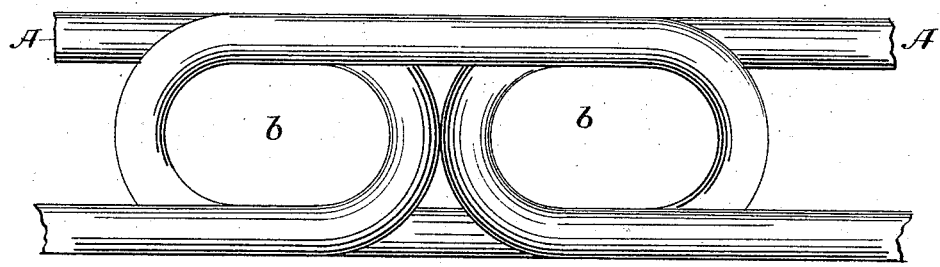
Figure 3:
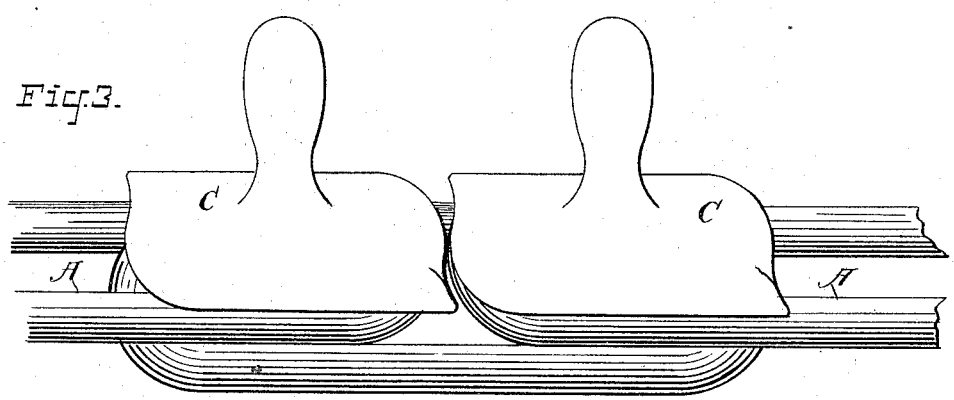

In the drawings, Figure 1 is a side view of a piece of chain cable such as commonly used in connection with sprocket-wheels in the construction of conveyer-machines, elevators, and other contrivances. Fig. 2 is a plan of top of the same piece of chain with its links backed together or with the parts condensed, so as to occupy as much less space lengthwise of the chain as possible without riding the links on top of each other to a depth of more than two links at any one point. Fig. 3 is a perspective view of the chain in the condition shown at Fig. 2, but with a series of stay blocks or plugs placed within the central openings of the links where the latter are overlapped to prevent any distention of the congregated links in the usual positions of such links on the application of a draft-strain to the section of the chain.

In the several figures the same parts will be found designated by the same letters of reference.

In carrying into effect my invention I take a section or length of chain, (of the kind shown, for instance, at Fig. 1,) but very much longer than it has heretofore been possible to use at a single testing or straining operation, and having backed the links A toward each other, and thus condensed the whole section of chain in length, after the fashion illustrated in Fig. 2, I then (or during the condensing manipulation) insert within all the central openings, *b*, of the overlapped links a set or series of retaining plugs or blocks, C, in the manner clearly illustrated at Fig. 3. With the section of chain (of usual length) thus condensed and having its links held against any tendency to elongate the chain by the blocks or plugs C, I subject the section to any desired and proper degree of draft-strain by the use of any of the known machines or appliances used in chain-testing, and am enabled at one operation to apply the test to as much more chain than would be possible under the old-fashioned modes or methods of procedure as is represented by the difference between the length or section of condensed chain (illustrated at Fig. 3) and the length said section would measure with the blocks C removed and the links pulled out into the relative positions illustrated at Fig. 1.

Of course in operating with chains of different sizes and having quite differently-proportioned links the details of the manipulations shown and described may be varied without departing from the principle of my invention. For instance, in the case of a chain having links with very large central openings it may be found practicable to condense the links more than shown at Figs. 2 and 3, and in some cases it may be found expedient to condense them less, and in the latter case another invention of my own (made the subject of another case filed simultaneously with this one) may be used in connection with my present improvement in the art for the purpose of sustaining laterally the side bars of the less-condensed links whenever it may be desired to subject the chain to an excessive test-strain.

Of course, in lieu of the solid plugs or blocks C, devices of the other form and structure may be employed for performing the function of holding the links in the position seen at Fig. 3 against the strain applied to test the strength of the links.

Wishing it, therefore, to be understood that my improvement in the art by which I am enabled, as explained, to test much larger quantities of chain in a given time and with the same expense as to power and hand-labor, is not necessarily restricted by any peculiarities as to the precise appliances shown for carrying it into effect, what I claim as new, and desire to secure by Letters Patent, is—

As an improvement in the art of testing chains comprising links with comparatively large central openings, subjecting the enchained links to the testing-strain while held in a condensed and overlapped condition, substantially as and for the purpose hereinbefore set forth.

In witness whereof I have hereunto set my hand this 22d day of April, 1887.

WILLIAM D. EWART.

In presence of—
GEO. LAWRENCE, Jr.,
J. G. MARSH.